(12) United States Patent
Schmid

(10) Patent No.: US 7,807,060 B2
(45) Date of Patent: Oct. 5, 2010

(54) FILTER WITH RESUSPENSION OF SOLIDS

(75) Inventor: Hans-Peter Schmid, Burgberg (DE)

(73) Assignee: BHS-Sonthofen GmbH, Sonthofen (DE)

( * ) Notice: Subject to any disclaimer, the term of this patent is extended or adjusted under 35 U.S.C. 154(b) by 157 days.

(21) Appl. No.: 11/571,629

(22) PCT Filed: Jul. 6, 2005

(86) PCT No.: PCT/EP2005/007313

§ 371 (c)(1),
(2), (4) Date: Jan. 4, 2007

(87) PCT Pub. No.: WO2006/005499

PCT Pub. Date: Jan. 19, 2006

(65) Prior Publication Data

US 2008/0061011 A1    Mar. 13, 2008

(30) Foreign Application Priority Data

Jul. 9, 2004    (DE) ........................ 10 2004 033 328

(51) Int. Cl.
*B01D 37/00* (2006.01)
*B01D 35/22* (2006.01)

(52) U.S. Cl. ........................ 210/769; 210/777; 210/791; 210/784; 210/783; 210/391; 210/393; 210/400; 210/402; 210/409; 210/411

(58) Field of Classification Search ........................ None
See application file for complete search history.

(56) References Cited

U.S. PATENT DOCUMENTS 1,667,465 A * 4/1928 Wait ............................ 210/768

(Continued)

FOREIGN PATENT DOCUMENTS

DE    19654165 C1 *    8/1998

(Continued)

OTHER PUBLICATIONS

Translation of IPER—6 Pages.*

*Primary Examiner*—Robert James Popovics
(74) *Attorney, Agent, or Firm*—Baker Botts LLP

(57) ABSTRACT

The invention relates to a method for extracting solids (23; 123) from a suspension (22; 122) containing the solids (23; 123) and suspension liquid (32; 132) in a continuously or virtually continuously operating filter device (10; 110) using a filtering material (26; 126), on the one side of which, the high-pressure side (30; 130), a higher pressure prevails than on its other side, the low-pressure side (42; 142), and which passes successively through a plurality of working zones (I-V; I-IV) of the filter device (10; 110) in a working direction (U), the suspension (22; 122) being supplied to the filtering material (26; 126) on its high-pressure side (30; 130) in a first working zone (I) and being filtered, the suspension liquid (22; 122) flowing through the filtering material (26; 126) on account of the difference in pressure between the high-pressure side (30; 130) and the low-pressure side (42; 142) while at least some of the solids (23; 123) are deposited on the filtering material (26; 126). As claimed in the invention, the solids (23; 123) which are deposited on the filtering material (26; 126) are resuspended in a washing liquid (50; 150), and the new suspension (resuspension) (53; 153) thus formed is filtered again in a second working zone (II) of the filter device (10; 110), which zone is arranged downstream of the first working zone (I) in the working direction (U).

11 Claims, 2 Drawing Sheets

U.S. PATENT DOCUMENTS

| | | | | | |
|---|---|---|---|---|---|
| 2,005,839 | A | * | 6/1935 | Edge | 162/329 |
| 2,352,304 | A | * | 6/1944 | Young | 210/798 |
| 2,478,150 | A | * | 8/1949 | Young | 96/180 |
| 2,510,254 | A | * | 6/1950 | Richter | 210/217 |
| 2,592,490 | A | * | 4/1952 | Thompson | 208/38 |
| 2,741,369 | A | * | 4/1956 | Fest | 210/217 |
| 2,791,171 | A | * | 5/1957 | Polk, Jr. | 100/98 R |
| 2,839,194 | A | * | 6/1958 | Lopker et al. | 210/772 |
| 2,963,158 | A | * | 12/1960 | Jung | 210/86 |
| 3,220,340 | A | * | 11/1965 | Frykhult | 100/121 |
| 3,258,391 | A | * | 6/1966 | Cornell et al. | 162/30.11 |
| 3,342,124 | A | * | 9/1967 | Frykhult | 100/121 |
| 3,363,774 | A | * | 1/1968 | Luthi | 210/404 |
| 3,403,786 | A | * | 10/1968 | Luthi | 210/217 |
| 3,409,139 | A | * | 11/1968 | Kristofl et al. | 210/404 |
| 3,487,941 | A | * | 1/1970 | Haapamaki | 210/404 |
| 3,587,863 | A | * | 6/1971 | Kristofl | 210/404 |
| 3,616,660 | A | * | 11/1971 | Ingermarsson | 68/22 R |
| 3,667,614 | A | * | 6/1972 | Komline | 210/401 |
| 3,772,144 | A | * | 11/1973 | Luthi et al. | 162/210 |
| 3,807,202 | A | * | 4/1974 | Gunkel | 68/181 R |
| 3,878,698 | A | * | 4/1975 | Friksson et al. | 68/22 R |
| 4,009,048 | A | * | 2/1977 | Jensen et al. | 134/12 |
| 4,085,003 | A | * | 4/1978 | Luthi | 162/259 |
| 4,137,177 | A | * | 1/1979 | Shoda | 210/403 |
| 4,182,680 | A | * | 1/1980 | Carle | 210/386 |
| 4,217,170 | A | * | 8/1980 | Luthi | 162/380 |
| 4,266,413 | A | * | 5/1981 | Yli-Vakkuri | 68/158 |
| 4,283,285 | A | * | 8/1981 | Paschen et al. | 210/326 |
| 4,292,123 | A | * | 9/1981 | Lintunen et al. | 162/60 |
| 4,378,253 | A | * | 3/1983 | Bouvet | 127/6 |
| 4,491,501 | A | * | 1/1985 | Klein | 162/60 |
| 4,502,171 | A | * | 3/1985 | Koskinen et al. | 5/156 |
| 4,505,137 | A | * | 3/1985 | Klein | 68/62 |
| 4,581,139 | A | * | 4/1986 | Kosonen | 210/232 |
| 4,686,005 | A | * | 8/1987 | Biondetti et al. | 162/60 |
| 4,732,651 | A | * | 3/1988 | Lisnyansky et al. | 162/49 |
| 4,746,405 | A | * | 5/1988 | Lisnyansky et al. | 162/252 |
| 4,750,340 | A | * | 6/1988 | Anderson | 68/43 |
| 4,769,986 | A | * | 9/1988 | Kokkonen et al. | 68/181 R |
| 4,808,265 | A | * | 2/1989 | Luthi et al. | 162/60 |
| 4,827,741 | A | * | 5/1989 | Luthi | 68/43 |
| 4,840,704 | A | * | 6/1989 | Seymour | 162/49 |
| 4,889,599 | A | * | 12/1989 | Lisnyansky et al. | 162/263 |
| 4,894,121 | A | * | 1/1990 | Luthi et al. | 162/329 |
| 4,919,158 | A | * | 4/1990 | Kokkonen et al. | 134/15 |
| 4,952,314 | A | * | 8/1990 | Henricson et al. | 210/404 |
| 4,994,248 | A | * | 2/1991 | Slater et al. | 423/320 |
| 5,046,338 | A | * | 9/1991 | Luthi | 68/43 |
| 5,073,264 | A | * | 12/1991 | Immonen et al. | 210/404 |
| 5,116,423 | A | * | 5/1992 | Kokkonen et al. | 134/15 |
| 5,139,671 | A | * | 8/1992 | Henricson et al. | 210/398 |
| 5,186,791 | A | * | 2/1993 | Seifert et al. | 162/56 |
| 5,192,454 | A | * | 3/1993 | Immonen et al. | 210/780 |
| 5,213,686 | A | * | 5/1993 | Funk et al. | 210/350 |
| 5,282,131 | A | * | 1/1994 | Rudd et al. | 700/44 |
| 5,290,454 | A | * | 3/1994 | Dorica et al. | 210/710 |
| 5,421,176 | A | * | 6/1995 | Ojala et al. | 68/43 |
| 5,437,599 | A | * | 8/1995 | Feldkamp et al. | 494/82 |
| 5,460,019 | A | * | 10/1995 | Ojala et al. | 68/43 |
| 5,656,162 | A | * | 8/1997 | Nilsson | 210/236 |
| 5,722,264 | A | * | 3/1998 | Antkowiak | 68/43 |
| 5,842,242 | A | * | 12/1998 | Antkowiak | 8/156 |
| 5,965,017 | A | * | 10/1999 | Nelson et al. | 210/217 |
| 5,985,159 | A | * | 11/1999 | Strid et al. | 210/783 |
| 6,004,468 | A | * | 12/1999 | Barbulescu et al. | 210/739 |
| 6,006,554 | A | * | 12/1999 | Gallagher | 68/181 R |
| 6,017,416 | A | * | 1/2000 | Judd | 162/60 |
| 6,042,735 | A | * | 3/2000 | Gommel et al. | 210/770 |
| 6,074,522 | A | * | 6/2000 | Seymour | 162/49 |
| 6,086,713 | A | * | 7/2000 | Qvintus et al. | 162/60 |
| 6,106,669 | A | * | 8/2000 | Gommel et al. | 162/56 |
| 6,159,338 | A | * | 12/2000 | Qvintus et al. | 162/56 |
| 6,162,325 | A | * | 12/2000 | Raslack et al. | 162/60 |
| 6,162,326 | A | * | 12/2000 | Gommel et al. | 162/100 |
| 6,245,196 | B1 | * | 6/2001 | Martin et al. | 162/11 |
| 6,440,265 | B1 | * | 8/2002 | Judd | 162/60 |
| 6,461,473 | B1 | * | 10/2002 | Qvintus et al. | 162/43 |
| 6,514,380 | B1 | * | 2/2003 | Laine et al. | 162/52 |
| 6,569,284 | B1 | * | 5/2003 | Yin et al. | 162/29 |
| 6,631,810 | B1 | * | 10/2003 | Lamas et al. | 210/402 |
| 2001/0027850 | A1 | * | 10/2001 | Martin et al. | 162/60 |
| 2005/0051473 | A1 | * | 3/2005 | Suss et al. | 210/345 |
| 2007/0210015 | A1 | * | 9/2007 | Egan, III | 210/787 |
| 2008/0061011 | A1 | * | 3/2008 | Schmid | 210/769 |
| 2008/0314541 | A1 | * | 12/2008 | Lundberg et al. | 162/232 |
| 2010/0099862 | A1 | * | 4/2010 | Sprehe et al. | 536/56 |

FOREIGN PATENT DOCUMENTS

| | | | | |
|---|---|---|---|---|
| DE | 10005796 | A1 | * | 8/2001 |
| EP | 334583 | A2 | * | 9/1989 |
| JP | 01280089 | A | * | 11/1989 |
| WO | WO 9710380 | A1 | * | 3/1997 |
| WO | WO 02/100512 | A1 | * | 12/2002 |

* cited by examiner

FILTER WITH RESUSPENSION OF SOLIDS

CROSS-REFERENCE TO RELATED APPLICATIONS

This application is a national stage of International Application Serial No. PCT/EP05/007313, filed Jul. 6, 2005, which claims the benefit of German Application Serial No. 102004033328.9, filed Jul. 9, 2004, each of which is incorporated by reference in their entireties herein, and from which priority is claimed.

The present invention relates to a method for extracting solids from a suspension containing the solids and suspension liquid in a continuously or virtually continuously operating filter device using a filtering material, on the one side of which, the high-pressure side, a higher pressure prevails than on its other side, the low-pressure side, and which passes successively through a plurality of working zones of the filter device in a working direction, the suspension being supplied to the filtering material on its high-pressure side in a first working zone and being filtered, the suspension liquid flowing through the filtering material on account of the difference in pressure between the high-pressure side and the low-pressure side while at least some of the solids are deposited on the filtering material. Furthermore, the present invention relates to a continuously or virtually continuously operating filter device which is designed for carrying out the above-described method.

A disadvantage of the known device and the known method is that, after the filtering of the suspension containing solids and suspension liquid, suspension liquid still remains adhering to the surface of solids or is enclosed in pores of a filter cake formed by deposited solids. The suspension liquid frequently has unfavorable chemical and/or physical properties for further processing the solids filtered out from it, in particular is toxic, with the result that as complete a separation of the suspension liquid from the solids contained in it as possible is desired.

For this purpose, as claimed in the prior art, a washing liquid is fed onto the filter cake formed on the filtering material, and, on account of the prevailing pressure difference, passes through the filter cake, which is situated on the high-pressure side, towards the filtering material and finally, after passing through the filtering material, is removed on the low-pressure side.

This washing enables some of the surfaces of the articles of solids in the filter cake to be freed from the suspension liquid, but the solids, which frequently bear tightly against one another in the filter cake, form pores or capillary gaps in which the suspension liquid adheres particularly persistently. The suspension liquid is therefore not reached at these points by the washing liquid or is at least not entirely rinsed out, with the result that, up to now, a certain residual content of suspension liquid has had to be accepted as unavoidable after filtering.

Starting from the abovementioned disadvantage of the prior art, it is therefore the object of the present invention to specify a technical teaching as claimed in which solids can be obtained from a suspension containing the solids and a suspension liquid as far as possible without any suspension-liquid residues. At least the purity of the solids with regard to the suspension liquid possibly still adhering to should be increased in comparison with the prior art.

This object is achieved as claimed in a first aspect by a method of the generic type in which the solids which are deposited on the filtering material are resuspended in a washing liquid, and the new suspension thus formed is filtered again in a second working zone of the filter device, which zone is arranged downstream of the first working zone in the working direction.

As claimed in a second aspect of the present invention, the abovementioned object is likewise achieved by a continuously or virtually continuously operating filter device for extracting solids from a suspension containing the solids and suspension liquid using a filtering material, on the one side of which, the high-pressure side, a higher pressure prevails than on its other side, the low-pressure side, and which passes successively through a plurality of working zones of the filter device in a working direction, the filter device having a first working zone in which the suspension is supplied to the filtering material on its high-pressure side and is filtered, the suspension liquid flowing through the filtering material on account of the difference in pressure between the high-pressure side and the low-pressure side while the filtering material retains at least some of the solids. In order to achieve the object, the filter device has a suspension device which is designed for the purpose of resuspending solids deposited on the filtering material in a washing liquid, the filter device furthermore having a second working zone which is arranged downstream of the first working zone in the working direction and in which the new suspension thus formed is filtered again.

In contrast to the washing known from the prior art, as claimed in the teaching of the present invention the solids deposited on the filtering material are resuspended in a washing liquid, i.e. are raised at least for a short time from the filtering material and taken up in the washing liquid. As a result, pores and capillary gaps between particles of solids that are formed during the depositing of the solids can be broken open and thus the suspension liquid contained there can also be removed from the solids.

The renewed suspension (resuspension) of the solids in the washing liquid causes them to move relative to one another and with high probability to be rinsed at least for a short time on all sides by washing liquid. Following this resuspension operation, the washing liquid is filtered out in a second working zone of the filter device that is downstream with respect to the first working zone.

It should be expressly pointed out that the first working zone does not necessarily have to be the absolutely first working zone of the filter device. Further method steps with regard to the method as claimed in the invention can be connected upstream of this first working zone, for example a heating or a cooling of the suspension to be filtered.

It is likewise not required for the abovementioned second working zone to immediately follow the first working zone. On the contrary, it is also possible for further working zones for carrying out different method steps to be connected between the first and the second working zones. The only thing that matters is for the second working zone to follow the first working zone as observed in the working direction of the filter device.

For the purpose of differentiation, the suspension which is originally to be filtered is referred to as suspension and the new suspension produced by resuspension is referred to as resuspension.

A contact time over which the solids are suspended in the washing liquid can be freely selected if a washing device is provided which is arranged outside the filter device and in which the solids are resuspended.

With an external washing device of this type, it is furthermore possible, in an advantageous manner, to refit existing filter devices in order to carry out the method as claimed in the invention, since, for the resuspension, no change to the existing division of working zones needs to be undertaken.

Finally, when an above-described, external washing device is used, use can be made of a mixing chamber for the resuspension, which chamber can be freely dimensioned without restriction in its size and therefore in its capacity in accordance with the requirements.

In order to assist the resuspension of solids in the washing liquid, it is advantageous, as claimed in a development of the present invention, if the washing liquid is set into a turbulent state of flow. This can take place structurally by the washing device comprising a conveying section with at least one static mixing element and/or with at least one dynamic mixing element and/or with at least one pump and/or with at least one mixing volume.

Static mixing elements can be, for example, flow obstacles which follow one another in the direction of flow, are offset with respect to one another orthogonally with respect to the direction of flow and have to be flowed around by the resuspension of solids and washing liquid. A coiled, in particular a meandering profile of the conveying section is likewise to be regarded within the sense of the present application as a static mixing element.

A stirring device and/or a mixing mill can be used, for example, as the dynamic mixing element. In the case of solids having a small particle size, the thorough mixing with the washing liquid can be carried out or at least be assisted by the pump mentioned.

The provision of at least one mixing volume also promotes the thorough mixing of washing liquid and solids and therefore the resuspension of the latter. A mixing volume can be provided, for example, by means of a cross-sectional enlargement of the conveying section or by means of containers situated in the conveying section and having a larger volume, with respect to a length of flow, than the conveying section.

As an alternative or in addition, the solids may also be resuspended in the filter device itself. This is advantageous particularly if there is insufficient construction space for the provision of an external washing device. For this purpose, the solids can be briefly raised from the filtering material on which they have been deposited. In a simple case, this can take place by flushing up by means of a jet of washing liquid. However, when the solids are resuspended in the filter device, the solids in the resuspension are always transported further in the working direction essentially by means of the filtering material.

In addition to or as an alternative to the resuspension of the solids by means of a high flow velocity of the washing liquids supplied, advantageously in such a manner that the washing liquid has a flow component pointing counter to the working direction, the solids may be resuspended by means of a stirrer. A stirrer of this type ensures that the solids are thoroughly mixed with the washing liquid. This thorough mixing causes the solids to be moved relative to one another and relative to the washing liquid, so that the individual particles of solids are sufficiently rinsed with washing liquid.

Since, in some embodiments of the present invention, the resuspension can take place only over a short conveying section, the use of a flat stirrer is advantageous, since, even in the case of a low depth of the resuspension flow over the filter medium, a flat stirrer can be immersed entirely in the resuspension, with the result that a high degree of stirring and therefore turbulence can be obtained while losses in efficiency of the stirrer are avoided.

In order to detach the solids from the filtering material, the filter device can have a scraping device. In this case, the solids can be mechanically detached from the filtering material. This method is very safe and reliable because of the physical barrier effect of the scraping device.

In addition or as an alternative, the detaching of the solids from the filtering material can be achieved by suitable injection of the washing liquid into the filter cake itself, for example, as said above, by injecting the washing liquid at a high flow velocity with a flow component directed counter to the working direction.

Furthermore, the detaching of the solids from the filtering material can be carried out or at least be assisted by counter-flushing with a liquid and/or by counter-blowing with a gas from the low-pressure side.

The use of a counter-flushing liquid mixed with gas appears particularly advantageous here, since, as a result, the quantity of liquid required for the counter-flushing can be significantly reduced while having the same detachment effect.

Some embodiments of filter devices provide chambers which are moved together with the filtering material and into which the suspension to be filtered in each case is poured. In this case, each chamber can be assigned on the low-pressure side at least one discharge pipe for removing the suspension liquid. This discharge pipe is moved together with the chamber.

In the case of the embodiments just described, in order to reduce the necessary number of components, the discharge pipe for the previously mentioned counter-flushing from the low-pressure side can be used for detaching the solids from the filtering material. For this purpose, a liquid is introduced into the discharge pipe in such a manner that it flows towards the filtering material. In this case, an undesirable return of suspension liquid previously discharged to the solids which have just been filtered out can be avoided in that the solids deposited on the filtering material are, after being filtered out, blown through with gaseous treatment fluid from the high-pressure side to the low-pressure side, for example until at least some of the suspension liquid, preferably all of the suspension liquid, has been displaced out of at least one discharge pipe still filled with suspension liquid from the first working zone.

This blowing-through of the deposited solids may also take place in a pulsed manner. For this purpose, one advantageously waits until a chamber of the filter device is situated completely in the region of action of a sealing unit which precedes the second working zone, preferably adjoins the first working zone and separates the second working zone from a preceding working zone, in particular from the first working zone. The chamber is then blown through with gas, for as long as it is situated entirely in the region of action of the sealing unit. The sealing unit seals off the chamber from the high-pressure side, so that the outlet pipe on the low-pressure side is the sole connection of the chamber to the surroundings, for as long as the chamber is situated entirely in the region of action of the sealing unit.

Gravitation effects are frequently used in filtering operations. For this purpose, the material to be filtered, in the present case the suspension, is conveyed through the filtering material in a specific manner with a predetermined orientation with respect to the direction of effect of gravity.

Effects of this type can be used in an advantageous manner in order to further dehumidify the solids in the first working zone in that, whenever that end of the first working zone which is downstream in the working direction is arranged in a section of the filter device that rises counter to gravity, a gaseous treatment fluid is supplied, in the downstream end region of the first working zone, to the solids deposited on the filtering material.

A particularly thorough cleaning of the suspension liquid from the solids can be obtained by the solids being subjected at least one further time to a resuspension washing, i.e. being removed from the filtering material, being resuspended in a washing liquid and finally being supplied again to the filtering material and being filtered out, and/or being subjected at least once to a conventional throughflow washing, i.e. being washed by means of washing liquid which flows from the high-pressure side of the filtering material to its low-pressure side.

In this connection, a plurality of resuspension washings can be carried out consecutively. As an alternative or in addition, it is also possible for at least one working step using throughflow washing known from the prior art to be carried out between resuspension washings and/or upstream thereof and/or downstream thereof. The sequence of resuspension and throughflow washings is as desired and is selected by the expert on the basis of the desired cleaning result, of cost stipulations and of the available construction space.

Whenever at least two washing operations take place consecutively, it is possible, as claimed in an advantageous development of the present invention, for them to be carried out in the form of a counter-flow washing. This considerably saves on washing liquid without causing a significant deterioration of the cleaning result. This relates both to resuspension washings and also to throughflow washings.

In the case of the counter-flow washing, fresher washing liquid is fed to the solids at the location of the second washing, i.e. further downstream in the working direction of the filter device, and filtered off. The less fresh washing liquid which has been filtered off is conveyed to that location of the first washing which is situated further upstream in the working direction of the filter device and is supplied there in a "pre-wash operation" to the solids and again filtered off from the latter. This step-by-step washing process may, of course, also be carried out with more than two washing operations. With this counter-flow washing, a very long washing section can be obtained with little use being made of washing liquid at the filter device, and therefore the washing liquid can be used very effectively for the cleaning.

In order to be able to obtain as good a cleaning result as possible, as claimed in an advantageous development of the invention, fresh washing liquid should be used in the case of at least one resuspension operation, i.e. a washing liquid which comes into contact for the first time with solids.

It is likewise possible, as described above, as claimed in an advantageous development of the present invention, to make use, in the case of at least one resuspension operation, of a washing liquid which has already been used at least once downstream in the working direction for washing solids. In this case, "washing" refers to both throughflow washing and a resuspension washing as claimed in the invention. This multiple use of the washing liquid enables a very good cleaning result to be obtained with a comparatively small quantity of washing liquid.

As claimed in a further advantageous embodiment of the present invention, the filter device can have a working zone which is designed for drying the deposited solids. The drying can take place by conducting a gaseous drying medium through the deposited solids. A hot drying medium has proven particularly advantageous in this case. Use is particularly preferably made of steam, in particular water steam, since the latter contains both the necessary heat in order to dry the deposited solids within a short time and is also sufficiently moist in order still to obtain an additional cleaning action during the drying.

Finally, the filter device can have a working zone in which the solids deposited on the filtering material are cleaned and, if desired, removed in dry form from the filter device and supplied to further processing steps.

A belt filter, a drum filter or a disk filter is suitable as the filter device.

The filter device can furthermore be designed as a "vacuum filter device" or else as a "pressure filter device" in order to produce a pressure gradient from the high-pressure side to the low-pressure side. In the case of a vacuum filter device, atmospheric pressure usually prevails on the high-pressure side of the filtering material while a negative pressure is produced on the low-pressure side. Conversely, in the case of a pressure filter device, a pressure exceeding the atmospheric pressure prevails on the high-pressure side while atmospheric pressure usually prevails on the low-pressure side. However, any type of pressure drop between high-pressure side and low-pressure side is sufficient. Thus, a pressure level situated above or theoretically even a pressure layer level situated below the atmospheric pressure can prevail both on the high-pressure side and on the low-pressure side as long as there is only a pressure drop from the high-pressure side to the low-pressure side.

If only a particularly short filter section is available, then it may also be conceivable to operate with a positive pressure with regard to the atmospheric pressure on the high-pressure side and to operate with a negative pressure with regard to the atmospheric pressure on the low-pressure side. By this means, a particularly high pressure gradient is achieved between the two pressure sides of the filtering material.

Vacuum filter devices are known, for example, in the form of vacuum belt filters, vacuum rotary filters and vacuum drum filters. Pressure rotary filters are likewise known and are also referred to as pressure drum filters. They can all be used as the filter device as claimed in the invention or for carrying out the method as claimed in the invention. Furthermore, it is also conceivable in principle to design the filter device as a pressure belt filter.

The present invention is explained in more detail below with reference to the attached drawings, in which.

Figure 1:
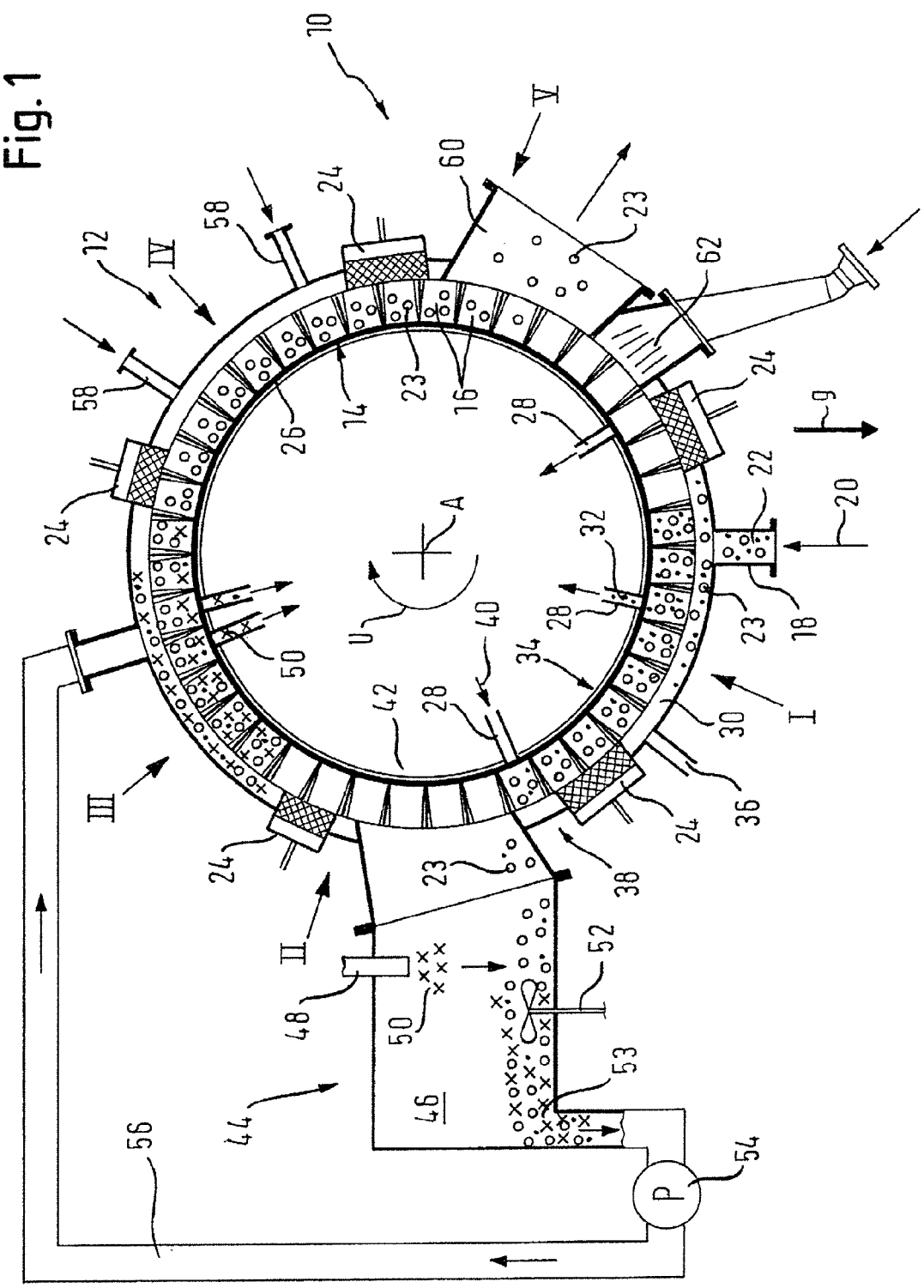
FIG. 1 shows a schematic cross-sectional view of a drum pressure filter device as claimed in the invention that operates as claimed in the method of the invention.

In FIG. 1, a filter device as claimed in the invention is referred to in general by 10. The filter device 10 comprises a pressure drum filter 12, the filter drum 14 of which rotates about an axis of rotation A in the clockwise direction along the arrow U (working direction U). The orientation of the filter drum 14 in the space is specified in FIG. 1 by the arrow g specifying the direction of effect of gravity.

The filter drum 14 has along its outer circumference chambers 16 which divide the outer circumference of the filter drum 14 in the circumferential direction. By means of a feed-in pipe 18 which is parallel to the direction of effect of gravity at least at the suspension outlet end, a suspension 22 is fed in in the direction of the arrow 20 into the chambers 16 in a first working region I of the pressure drum filter 12 under a positive pressure in comparison to the prevailing atmospheric pressure.

The working regions I to V are separated from each other in the circumferential direction by means of sealing elements 24. The sealing elements 24 seal chambers 16 which pass radially outwards towards the surroundings through the circumferential region of the filter 12, in which the sealing elements 24 are arranged. Furthermore, the sealing elements 24 also provide a seal in the circumferential direction, so that influences on the chambers 16 in one specific working zone do not have an effect on chambers 16 of the immediately preceding or immediately following working zone.

The suspension 22 comprises solids 23, which are indicated by circles, and a suspension liquid 32, which is indicated by dots.

A filtering material 26 which forms part of the floors of the chambers 16 rests on the filter drum 14. The filtering material 26 may be formed from a fabric or a tangle of fibers or the like. Depending on each case on the suspension to be filtered, the filtering material 26 may comprise metal and/or synthetic and/or natural fibers.

The chambers 16 each have a discharge pipe 28 which revolves together with the chamber 16 assigned to it in the clockwise direction about the axis A. For the sake of simplicity, discharge pipes 28 are shown only at five of the chambers 16 in FIG. 1.

The moving discharge pipes 28 are coupled further downstream to rigid discharge pipes (not illustrated) by means of a corresponding coupling, with each working zone preferably being assigned a dedicated rigid discharge pipe.

In the working zone I, the positive pressure on the radially outer high-pressure side 30 causes the suspension liquid 32 to be removed radially inwards through the filtering material 26. In this case, via a pipe 36 at the downstream end region 34 of the working zone I, a gas is bubbled into the suspension 22, the gas, owing to the equilibrium of pressure in the working zone I, having the same pressure as the suspension 22 itself. This bubbled-in gas additionally removes suspension liquid 32 from the solids and removes it via the discharge pipes 28. In addition, the bubbled-in gas at the downstream end region 34 of the working zone I displaces suspension liquid 32 out of the discharge pipes 28 at least in the region in the vicinity of the chamber.

At the end of the working zone I, most of the suspension liquid 32 is filtered off. There remain solids with a certain residual moisture and with residues of suspension liquid which is enclosed and contained in pores and capillary gaps.

The sealing element 24 immediately following the working zone I has gas-injection nozzles (not illustrated) which inject gas at positive pressure in comparison to the filter discharge side into a chamber 16 for as long as this chamber is situated entirely under the sealing element 24 and is sealed by the latter. This gas injection causes suspension liquid 32 to continue to be removed from the discharge pipes 28.

In the following working zone II, initially at the upstream end region 38 of this zone, a counter-flushing liquid, for example water, which is mixed with gas is conducted radially outwards in the direction of the arrow 40 from the low-pressure side 42 to the filtering material 26 in order to detach the solids which have been deposited on the filtering material 26 in the chambers 16 from the filtering material 26.

The solids are then removed from the chambers 16 and supplied to a washing device 44.

The washing device 44 comprises a mixing volume 46 in the form of a mixing container into which a pipe 48 is guided through which washing liquid 50, for example water, is supplied to the solids removed from the chambers 16.

Furthermore, the mixing volume 46 comprises a stirrer 52 which mixes the injected washing liquid 50 with the solids 23. As a result, the solids 23 are rinsed around by the washing liquid 50, so that capillary gaps and pores are broken up and suspension liquid 32 which is possibly present therein can be rinsed away.

The solids resuspended in the mixing volume 46 with the washing liquid 50 are supplied as a resuspension 53 by means of the pump 54, which ensures that washing liquid 50 and solids 23 are further swirled and thoroughly mixed, via the piping system 56 in a working zone III, into the chambers 16 of the filter drum 14 again. In this case, the resuspension 53 is under the positive pressure, which is produced by the pump 54, relative to the atmospheric pressure. In the working zone III, owing to the pressure drop between the high-pressure side 30 and the low-pressure side 42, the washing liquid 50 is pushed radially inwards through the filtering material 26 into the discharge pipes 28 and is removed. In the process, they carry along the suspension-liquid residues detached from the solids 23. At the end of the working zone III, as observed in the clockwise direction, solids 23 which are cleaned but are still residually moist because of washing liquid 50 are situated in the chambers 16.

In a working zone IV which adjoins the working zone III if the filter drum 14 is moved in the clockwise direction, the solids 23 in the chambers 16 are charged with hot water steam via pipes (not illustrated further) connected to pipe connectors 58, as a result of which the solids 23 are further cleaned and moreover are dried. The water steam is removed via the discharge pipes 28 and thus also brings about a partial cleaning of the discharge pipes 28.

Finally, an ejection device 60 in a working zone V immediately adjoining the working zone 4 in the working direction U is used to remove the dried solids material 23 from the pressure drum filter 12 and to supply it for further processing.

Following the ejection device 60 in the working direction U, the filtering material 26 is charged with a cleaning fluid 62 and is cleaned before a renewed application of suspension 22 to be filtered. The cleaning fluid 62 is likewise removed through the discharge pipes 28 and thus also brings about a cleaning of the discharge pipes 28.

Figure 2:
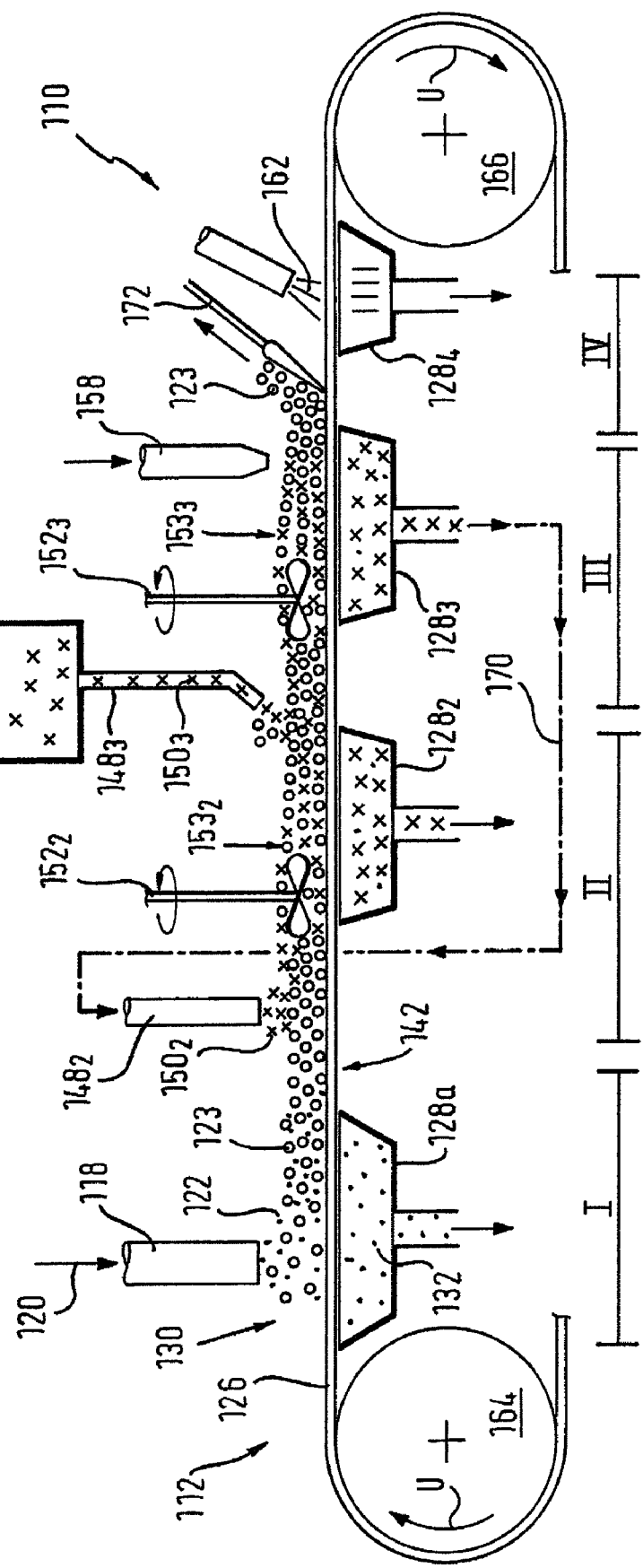
FIG. 2 shows a second embodiment of a filter device as claimed in the invention in the form of a vacuum belt filter device which likewise operates as claimed in the method of the invention.

FIG. 2 illustrates a second embodiment of a filter device of the present invention. The same components as in FIG. 1 are provided with the same reference numbers but increased by 100. For the explanation thereof, reference is expressly made to the description of FIG. 1.

FIG. 2 illustrates a vacuum belt filter device 112. A belt-shaped filtering material 126 revolves around two rollers 164 and 166 which are parallel to the axis of rotation and rotate in the same direction clockwise along the arrows U (working direction U). Suspension liquid 122 is applied to the filtering material 126 via a feed pipe 118. A vacuum box 128a produces a negative pressure in a first working zone I and removes suspension liquid 132.

In the following two working zones II and III of FIG. 2, a washing liquid $150_2$ and $150_3$ is applied in each case through a pipe $148_2$ and $148_3$ to the solids 123 deposited on the filtering material 126. Following application of washing liquid, a resuspension of the solids 123 with the washing liquid takes place by means of stirrers $152_2$ and $152_3$. Vacuum suction boxes $128_2$ and $128_3$ produce a negative pressure below the filtering material 126, i.e. on the low-pressure side 142 on which the suspension 122 is not applied, and, as a result, remove the washing liquid 150 from the particular resuspension 153.

The pipe $148_3$ is curved here on the output side counter to the working direction U, so that the washing liquid $150_3$ exits towards the filtering material 126 with a flow component directed counter to the working direction U. This is used to detach the solids 123 from the filtering material 126 and to thoroughly mix them.

The thorough mixing result can be further improved if the washing liquid $150_3$ emerges from the pipe $148_3$ as a sharp jet under high pressure, i.e. with a high flow velocity and small flow cross section.

It should be noted as a particular feature that the pipe 148₃ which is connected to a washing-liquid store 168 is used to feed fresh washing liquid 150₃ to the solids 123, i.e. washing liquid 150 which comes into contact with the solids 123 for the first time. The slightly impurified washing liquid 150 sucked off from the vacuum suction box 128₃ is, as illustrated by the chain-dotted line 170, applied again to the solids 123 on the filtering material 126 upstream by the pipe 148₂, i.e. counter to the working direction U. This achieves a "counter-flow washing", i.e. a pre-cleaning of the solids takes place in the working zone II using slightly impurified washing liquid 150₂ and a final cleaning of the solids deposited on the filtering material 126 takes place in the working zone III using fresh working liquid 150₃. As a result, the washing liquid 150 can be effectively used and a very high degree of purity of the solids 123 can be obtained.

In the working direction U at the end of the working zone III, hot water steam is again blown through a nozzle 158 onto the solids 123 in order to dry them.

In the working zone IV which immediately adjoins the working zone III, the dried and cleaned solids material 123 is raised from the filtering material 126 with a mechanical raising device 172 and supplied for further processing (not illustrated). Finally in the working direction U, the filter medium 126 is charged with cleaning liquid 162 which is removed by a vacuum suction box 128₄ on the low-pressure side 142.

It should be noted that both the pressure filter drum 14 in FIG. 1 and the filter belt 126 in FIG. 2 can be moved in the working direction U in a pulsed manner or continuously.

The invention claimed is:

1. A method for extracting solids from a suspension containing the solids and suspension liquid in a continuously or virtually continuously operating drum filter device, the filter volume of the drum filter being separated into chambers which receive the suspension to be filtered, using a two-sided filtering material, on the one side of which, the high-pressure side, a higher pressure prevails than on its other side, the low-pressure side, and which passes successively through a plurality of working zones of the filter device in a working direction, the method comprising the steps of:

supplying the suspension to the filtering material on its high-pressure side in a first working zone;

filtering the suspension wherein the suspension liquid flows through the filtering material on account of the difference in pressure between the high-pressure side and the low-pressure side while at least some of the solids are deposited on the filtering material forming a filter cake;

resuspending the solids which are deposited on the filtering material by injection of the washing liquid into the filter cake in chambers of a second working zone, which zone is arranged downstream of the first working zone in the working direction; and filtering the resuspension via a conveying system in chambers of a third working zone, which zone is arranged downstream of the second working zone in the working direction.

2. The method of claim 1, wherein the solids are resuspended in a washing device arranged outside the filter device.

3. The method of claim 2, wherein the washing device comprises a conveying section with at least one of a static mixing element, a dynamic mixing element, a pump and a mixing volume.

4. The method of claim 1, wherein the solids are resuspended in the filter device.

5. The method of claim 1, wherein the solids, are resuspended by a high flow velocity of the supplied washing liquid.

6. The method of claim 1, wherein the solids are detached from the filtering material by counter-flushing, counter-blowing or both.

7. The method of claim 6, wherein a counter-flushing liquid mixed with gas is used.

8. The method of claim 1, wherein the solids deposited on the filtering material are, after being filtered out, blown through with gaseous treatment fluid until at least some of the suspension liquid has been displaced out of at least one discharge pipe still filled with suspension liquid from the first working zone.

9. The method of claim 1, wherein whenever that end of the first working zone which is downstream in the working direction is arranged in a section of the filter device that rises counter to gravity, a gaseous treatment fluid is supplied, adjacent to that end, to the solids deposited on the filtering material.

10. The method of claim 1, wherein the resuspending step is repeated.

11. The method of claim 10 further comprising the step of washing the solids with a washing liquid which flows from the high pressure side of the filtering material to its low pressure side.

* * * * *